Figure 1:
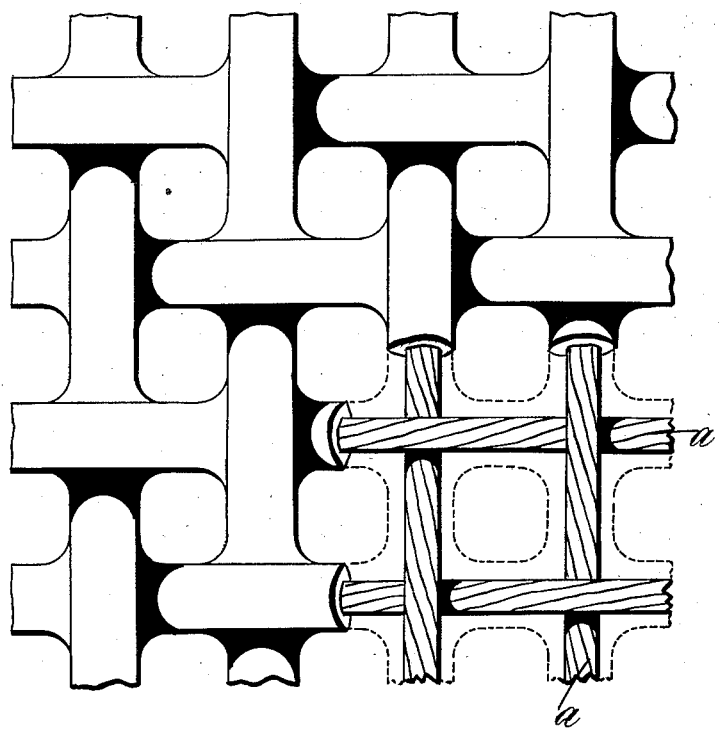

P. MARINO.
ELECTROLYTIC SEPARATOR AND PROCESS FOR MAKING THE SAME.
APPLICATION FILED DEC. 24, 1910.

1,020,149.

Patented Mar. 12, 1912.

WITNESSES
G. V. Rasmussen
J. A. Ferguson

INVENTOR
PASCAL MARINO
BY
Bieser Kwauth
ATTORNEYS

UNITED STATES PATENT OFFICE.

PASCAL MARINO, OF LONDON, ENGLAND.

ELECTROLYTIC SEPARATOR AND PROCESS FOR MAKING THE SAME.

1,020,149.  Specification of Letters Patent.  Patented Mar. 12, 1912.

Application filed December 24, 1910. Serial No. 599,107.

*To all whom it may concern:*

Be it known that I, PASCAL MARINO, a subject of the King of Italy, and resident of London, N. W., England, have invented new and useful Improvements in Electrolytic Separators and Processes for Making the Same, of which the following is a specification.

The electrode separators of secondary storage cells and electrolytic apparatus have, heretofore, usually consisted of perforated sheets of either ebonite or celluloid (which notably increase the internal resistance of the cell to the detriment of its capacity, inasmuch as less than half their area is available for the passage of the electrolyte and the electric current) or of other materials such as asbestos, glass-wool, porous earthenware and the like, while I have proposed the use of separators consisting of sheets or strips of wood which have been treated either with sulfuric acid, with Schweitzer reagent (a solution of cupric hydroxid in ammonia), or with hydrogen peroxid. Of all materials, however, those of animal or vegetable origin appear to serve the purpose best; fabrics or materials whose fibers are of animal origin (*i. e.* wool, silk, etc.) being most suitable when the separator is in contact with an acid electrolyte (for the reason that strong mineral acids have little action on fibers of animal origin, whereas the latter become completely dissolved in alkaline solutions), while fabrics or materials of vegetable origin (such as flax, hemp, cotton, ramie, jute etc.) are preferable when the separators are in contact with alkaline electrolytes owing to the fact that such materials remain unattacked in concentrated alkaline solutions, but are transformed into dextrin when placed in the presence of electrolytes containing mineral acids.

The present invention consists in a process of treating fabrics or materials particularly those of either animal or vegetable origin in order to render them suitable for the construction of separators and includes the separators made by said process.

The material may be in the form of a thread or a knitted fabric or stockinet which may be arranged as a separator in any well known manner, such as, for example, by winding said material on or otherwise affixing it to a suitable frame, or by forming it into a sheath for inclosing one or both of the electrodes.

The particular arrangement of the separator is however immaterial, my invention consisting broadly in a process whereby fibrous materials, whether in the form of fabrics or threads, are rendered capable of withstanding, for a considerable time, the destructive action of the electrolyte and of the other effects due to electro-chemical causes.

I will refer by way of example to a separator made of a woven fabric treated, as hereinafter described, so as to render it suitable for use as an electrode separator. In practice the fabric may conveniently be spread around and fixed to a rigid and non-conductive frame in the manner previously described, constituting a membrane which permits the free migration of the ions circulation of the electrolyte throughout the entire area of the separator, and uniform distribution of the electro-chemical effect over the whole surface of the electrodes.

The process of my invention consists in the following operations:—1°, immersing the material in a formaldehyde solution; 2°, immersing the material in an alkaline silicate bath and thereafter in a suitable acid bath such as dilute phosphoric or sulfuric acid to form soluble substances; 3°, coating the material with gutta-percha, indiarubber or celluloid; 4°, coating the material with paraffin wax or asphalt.

The process is carried out in the following manner. The material is in the first place immersed, for approximately 24 hours, in a bath consisting of 5 to 8 parts of commercial formaldehyde, and 95 parts of water. As a result the formaldehyde becomes completely absorbed by the fibers without bringing about any alteration in the shape of the fabric or material. This preliminary treatment is optional, but it is preferable especially when the fibers being treated are of animal origin, because it serves to render insoluble the gelatin present in such fibers. The material is then immersed in a bath prepared by mixing, as intimately as possible, 10 parts of pure and very finely pulverized asbestos with 100 parts of a solution of an alkaline silicate preferably potassium silicate at about 25° Baumé, the proportions stated being either by "weight" or by "volume." It is then withdrawn from the bath, allowed to dry and then immersed in a bath of dilute phosphoric acid (specific gravity 1.0270), or a bath of dilute sulfuric acid (specific gravity 1.0331) or a bath of any other acid suitable for precipitating silica on the material. After it has remained in the latter bath for several minutes the material is withdrawn and washed in water to remove all soluble matters and again allowed to dry. The fibrous material having thus become coated with silica is coated with a protective film of solution of guttapercha or indiarubber which may be prepared as follows. Pure guttapercha in very small pieces is dissolved in carbon disulfid, ether, benzene, etc., (or other suitable solvent) for a period of 6 or 7 days in a hermetically closed vessel provided with suitable stirrers; or alternatively, very small pieces of pure indiarubber are subjected in a similar vessel first to the action of carbon disulfid for a period of 3 to 4 days and then to the action of benzene or suitable solvent, the proportions of guttapercha or indiarubber being 15 parts to 100 parts of the solvent employed. The fibrous material may be coated with this indiarubber or gutta-percha solution, or with a mixture in equal parts of the gutta-percha and indiarubber solutions either by immersion or application by means of a brush or otherwise. In lieu of the gutta-percha or indiarubber solutions, I may employ a celluloid solution obtained by dissolving 10 parts of scraps or chips of celluloid in 40 parts of alcohol and 40 parts of ether in a closed vessel, the fibrous material having been coated with the silica being then coated with the celluloid solution. Finally, the material is immersed for about 15 minutes in a solution of 15 parts of a substance of bituminous origin such as paraffin-wax or asphalt completely dissolved in 100 parts of ether or other solvent.

The materials and fabrics treated in the manner described do not lose that high degree of permeability which they originally possessed and which permits of the free migration of the ions and the passage of the electrolyte and the gases given off, while they acquire the mechanical strength necessary to enable them to resist, for a long time, and under all conditions, the destructive action due either to the electrolyte, the electric current, or to the active materials upon the electrodes. Furthermore, the employment as separators between the positive and negative electrodes, of fabrics which possess to such a marked extent the quality of permeability does not appreciably add to the internal resistance of the cell.

An embodiment of my invention is illustrated in the accompanying drawing wherein—

Figure 2:
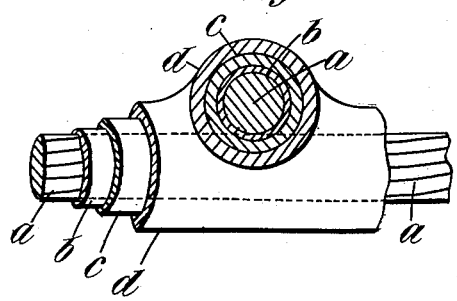

Figure 1 shows, on an enlarged scale, a face view of a portion of a separator made from an open-mesh canvas fabric, Fig. 2 being a further enlarged detail view of the crossing of two threads of the fabric with the superposed coatings.

$a$, $a$ are the two threads of the fabric, $b$ the silica coating, $c$ the coating of organic substance, and $d$ the external coating of bituminous origin.

I claim:

1. An electrolytic separator consisting of fibrous material having superposed coatings thereon of silica and an organic substance.

2. An electrolytic separator consisting of fibrous material having coatings thereon of silica, an organic substance and a substance of bituminous origin.

3. An electrolytic separator consisting of fibrous material having coatings thereon of silica and gutta percha.

4. An electrolytic separator consisting of fibrous material having coatings thereon of silica, gutta percha and paraffin wax.

5. The herein described process of making electrolytic separators which consists in treating fibrous material successively with an alkaline silicate, an acid and an organic substance.

6. The herein described process of making electrolytic separators which consists in treating fibrous material with formaldehyde, an alkaline silicate and an acid.

7. The herein described process of making electrolytic separators which consists in treating fibrous material with formaldehyde, an alkaline silicate, an acid and an organic substance.

8. The herein described process of making electrolytic separators which consists in treating fibrous material with an alkaline silicate, an acid, an organic substance and a substance of bituminous origin.

9. The herein described process of making electrolytic separators which consists in treating fibrous material with an alkaline silicate, an acid and a solution of gutta percha.

10. The herein described process of making electrolytic separators which consists in treating fibrous material with an alkaline silicate, an acid, a solution of gutta percha and a substance of bituminous origin.

11. The herein described process of making electrolytic separators which consists in treating fibrous material with an alkaline silicate, an acid, a solution of gutta percha and a solution of paraffin wax.

12. The herein described process of making electrolytic separators which consists in treating fibrous material with formaldehyde, an alkaline silicate, an acid, a solution of gutta percha and a solution of paraffin wax.

PASCAL MARINO.

Witnesses:
GEORGE E. MINTERN,
E. P. BARKER.